INVENTOR
K.G. HUNTLEY
By
ATTORNEYS

INVENTOR
K. G. HUNTLEY
By Glascock Downing & Seebold
ATTORNEYS

United States Patent Office 2,817,704

Patented Dec. 24, 1957

2,817,704

ELECTRICAL CODE SYSTEMS

Keith Gordon Huntley, Harlington, Hayes, England, assignor to Electric & Musical Industries Limited, Hayes, Middlesex, England, a company of Great Britain Application May 12, 1954, Serial No. 429,306

Claims priority, application Great Britain May 16, 1953

4 Claims. (Cl. 178—43.5)

Figures 1, 3:
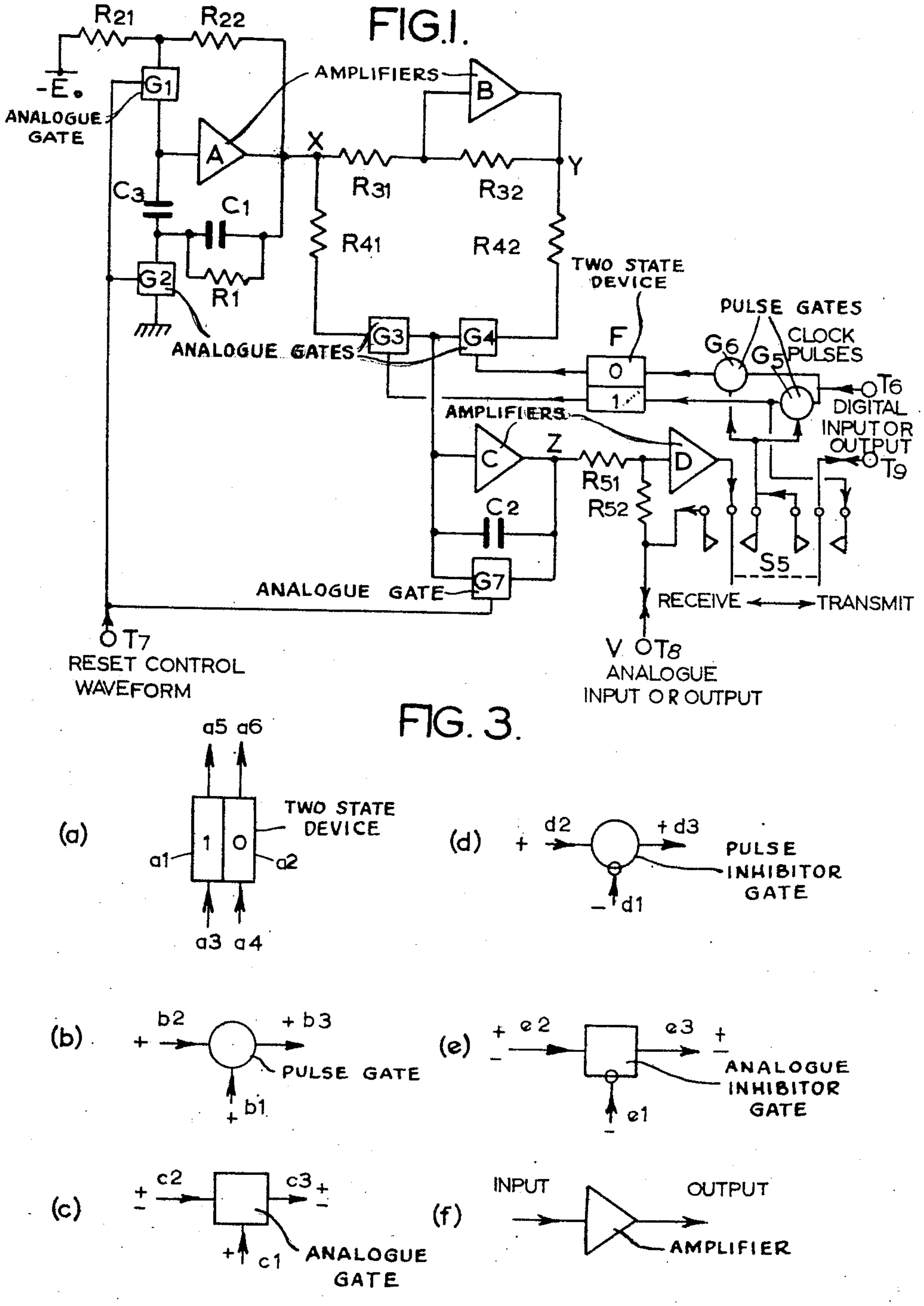

This invention relates to electrical code systems and in particular to apparatus for encoding electrical analogue signals into binary code signals and for decoding binary code signals into electrical analogue signals.

In certain information interchange systems speech or other data to be transmitted is presented at one end of the channel, which may be a radio or cable channel, in analogue form, for example in the form of an electrical potential or current, and before transmission it has to be coded into binary pulse code form. Similarly, the pulse code signals, on reception, have to be decoded into the original analogue form. Apparatus for effecting the encoding or decoding is usually of considerable complexity, particularly where a high degree of differential accuracy is required.

The object of the present invention is to provide improved apparatus for encoding electrical analogue signals into binary code signals or for decoding binary code signals into analogue signals with a view to achieving reliability with relatively simple apparatus.

According to one aspect of the present invention there is provided apparatus for encoding an electrical analogue signal into binary digital code comprising means for setting up a unidirectional signal whose value decreases exponentially, means for setting up the inverse of said unidirectional signal, a signal accumulator, a first normally closed gate for applying said unidirectional signal to said accumulator, a second normally closed gate for applying said inverse signal to said accumulator, means for comparing an applied analogue signal with a signal in said accumulator at successive instants between which said unidirectional signal decreases by one half its value at the preceding instant, and means for opening one of said gates when one compared signal exceeds the other compared signal, and for opening the other gate when said one compared signal is less than said other compared signal of each individual signal to said series, means for reversing the sign of the succeeding signal or signals of said series each time the remainder changes sign and means for transmitting code signals in dependence upon the signs of successive remainders.

According to another aspect of the present invention there is provided apparatus for decoding binary digital code signals into an electrical analogue signal comprising means for setting up a unidirectional signal whose value decreases exponentially, means for setting up the inverse of said unidirectional signal, a signal accumulator, a first normally closed gate for applying said unidirectional signal to said accumulator, a second normally closed gate for applying said inverse signal to said accumulator, means for opening one of said gates in response to a unity signification in a received binary code signal, means for opening the other of said gates in response to a zero signification in a received binary code signal whereby the signal accumulated in said accumulator in response to a received binary code signal is the analogue of said received signal.

In order that the invention may be clearly understood and readily carried into effect, the invention will be described with reference to the accompanying drawings.

Figure 2:
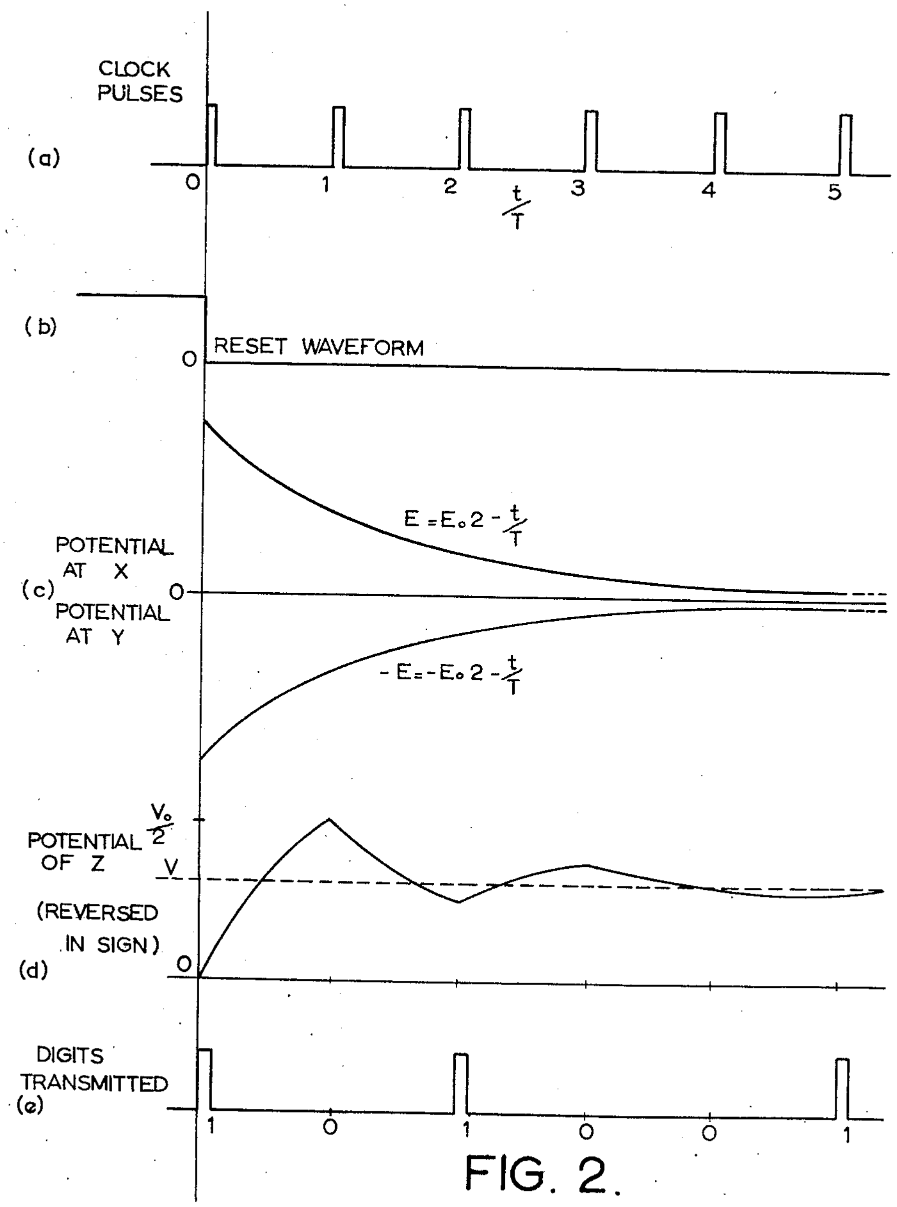

Figure 1 illustrates one example of the present invention which can be selectively employed for encoding electrical analogue signals or decoding pulse code signals, Figure 2 comprises waveform diagrams explanatory of the operation of Figure 1, and Figure 3 illustrates symbols used in Figure 1 to represent conventional circuit units in order to simplify the drawing and facilitate description thereof.

Referring to Figure 3 the symbol (*a*) represents a two-state device, for example of the Eccles-Jordan type, consisting of two sections which are alternately energised in the different states of the device. When the device is in state "0," the section marked "0" is energised and when the device is in state "1" the section marked 1 is energised. Input and output connections are indicated by arrows *a3*, *a4* and *a5*, *a6* respectively. An input signal to a section which is not energised and which switches the device to its alternate condition is assumed to be positive. The output signal from an energised section is assumed to be positive.

Symbol (*b*) represents a pulse gate having two input connections *b1* and *b2* and a single output connection *b3*. The simultaneous occurrence of positive pulses at the input connections yield a positive pulse at the output but otherwise no output is received. A suitable form of pulse gate is described in "Proceedings of the IRE," May 1950, page 511.

Symbol (*c*) represents an analogue gate likewise having two input connections *c1* and *c2* and a single output connection *c3*. A positive voltage applied to the side input connection *c1* opens the gate by establishing a low impedance path between *c2* and *c3*. Such a gate is generally bi-directionally conductive when open. A suitable form of analogue gate is illustrated in Figure 10.11, page 375 of "Waveforms" in the Massachusetts Institute of Technology Radiation Laboratory Series.

Symbol (*d*) represents pulse inhibitor gate with an inhibit input connection *d1*, a normal input connection *d2*, and an output connection *d3*. A positive pulse applied via *d1* inhibits transmission of positive pulses from *d2* to *d3*. However, a negative or zero potential at *d1* permits the transmission of a positive pulse from *d2* to *d3*. A pulse inhibitor gate may be of similar construction to a pulse gate such as represented by symbol (*b*) with however one of the controls reversed.

Symbol (*e*) represents an analogue inhibitor gate with an inhibit input connection *e1*, a normal input connection *e2*, and an output connection *e3*. A negative or zero potential at the inhibit input *e1* establishes a low impedance path between *e2* and *e3* but otherwise transmission from *e2* to *e3* is inhibited. Such a gate is generally bi-directionally conductive. An analogue inhibitor gate may be of similar construction to an analogue gate such as represented by symbol (*c*), with however one of the controls reversed.

Symbol (*f*) represents a high gain D. C. coupled amplifier.

The encoding-decoding system shown in Figure 1 yields simultaneous encoding and transmission (and conversely reception and decoding). Considering the apparatus as an encoder it operates on the basis of subtracting the signal to be encoded from the sum of a series of signals each of which has half the magnitude of the preceding signal, but the sign of which may be either positive or negative. The series of signals is summed, term by term, and following each addition the sign of the remainder is tested and pulse code signals are transmitted in dependence upon the signs of the remainders. Signals representative of successive terms in the series are all fed in at one point, one at a time, and the running total is stored in an analogue store.

The apparatus shown in Figure 1 comprises an amplifier A associated with gates G1 and G2 and a feedback path including capacitor C1 shunted by resistor R1. Capacitor C3 is a blocking capacitor. Gates G1 and G2 are controlled by a waveform applied to terminal T7 and with the gates open, a potential $E_2$ is established at the output X of amplifier A by seesaw feedback action via equal resistors R21 and R22, the amplifier receiving its input from a source of reference potential $-E_{0S}$ as indicated. The operation of see-saw phase reversing amplifiers is described for example in the Journal of the Institution of Electrical Engineers, volume 93, part IIIA, page 303. Capacitor C1, which in the meantime is connected to ground via gate G2, is thus charged to the potential $E_0$. On closing the gates G1, G2, the reference potential $-E_0$ is disconnected from the input of the amplifier and the amplifier feedback is via C1 and R1 only. The output potenetial at X will therefore decay exponentially to zero with a time constant C1R1. This time constant is arranged to be equal to $T/\log_e 2$, that is approximately 1.44T, where T is the period of clock pulses which are applied to a terminal $T_6$. As will hereinafter appear the clock pulse period is the binary code digit interval for the apparatus. At any instant therefore during the discharge of the capacitor, the potential at X (as indicated in Figure 2(*c*)) can be represented by $$E=E_o 2^{-\frac{t}{T}}$$

so that at successive instants separated by an interval T, the potential E has half the value it had at the preceding instant.

A see-saw amplifier B having equal see-saw resistors R31, R32 serves to give an output potential at Y equal to $-E$. The points X and Y serve as alternative sources of input potential for a further amplifier C which has a feedback path which includes a capacitor C2, the point X being connected to amplifier C via resistor R41 and analogue gate G3 and the point Y being connected to amplifier C via resistor R42 and gate G4. The gates G3 and G4 are operated in push-pull relation by two-state device F to the alternate inputs of which clock pulses are applied via a pulse inhibitor gate G5 and a pulse gate G6. The last-mentioned gates receive input signals selectively from the digital input and output terminal T9 or from an amplifier D dependent upon the condition of a switch S5. The amplifier D has two input sources, namely the output Z of the amplifier C via resistor R51, and terminal T8 via resistor R52. Terminal T8 is the input or output terminal for the analogue potential.

In operation of Figure 1, when the switch S5 has been operated to the right to condition the equipment for transmission, amplifier D functions as a discriminating amplifier for determining the sign of the difference between the potential at Z and the potential at T7. In the waveform diagrams shown in Figure 2, the abscissae represent time and on the time scale chosen, the clock pulse period T is taken as the unit of time. Prior to the time $t=0$ in these diagrams a positive potential is applied to terminal T7 which by opening a gate 7 discharges the capacitor C2 and by opening gates G1 and G2 causes capacitor C1 to be charged to the potential $E_0$. The removal of the positive potential from T7 at time $t=0$ is caused to coincide with the leading edge of a clock pulse. At this instant the potential at point Z is zero and the amplifier D senses the sign of the analogue potential V applied to terminal T8. If V is positive the output of the amplifier D is negative so that the first clock pulse cannot be transmitted by G6 but is transmitted by G5. Device F is therefore switched to state "1" and opens gate G3, and the potential E obtaining at point X is integrated in C2 through R41. Since the gates G1 and G2 are closed at time $t=0$ the potential E exhibits the exponential decay indicated in Figure 2(*c*). The time constant of C2R4 (where R4 is the value of R41, and also of R42) is chosen to give a rise of potential $V_o/2$ in the first clock pulse period T, where $V_o$ is the maximum value which the input analogue potential V can have.

It is convenient to make $E_o=V_o$ and then $$\frac{E_o}{C2R4}\int_0^T e^{\frac{-t}{1.44T}}dt=\frac{E_o}{2}$$

$$\therefore \int_0^T e^{\frac{-t}{1.44T}}dt=\frac{C2R4}{2}$$

$$-1.44T\left[e^{\frac{-t}{1.44T}}\right]_0^{6T}=\frac{C2R4}{2}$$

$$1.44T(1-\tfrac{1}{2})=\frac{C2R4}{2}$$

or $$C2R4=1.44\mathrm{T}$$

At time 1 a further clock pulse occurs and it is passed by G5 or G6 dependent upon the sign of the difference between the instantaneous potential at Z and the potential V. As aforesaid, and as shown in Figure 4(*d*), the instantaneous potential at Z has the magnitude $V_o/2$ and although it has been indicated as positive in Figure 2(*d*) it is in fact negative on account of phase reversal in the amplifier C. In effect the positive of the potential at Z is subtracted from V in the input circuit of the amplifier D and this amplifier detects the sign of the remainder. It will be assumed that V is represented by the horizontal line in Figure 2(*d*), and therefore at time 1, the remainder is negative. The output of amplifier D is therefore positive and it shuts G5 and opens G6. Device F is thereupon triggered into state "0," that is the section 0 is energised and G4 is opened and G3 shut. The potential $-E$ at Y is now integrated in G2 and at time 2 the instantaneous potential at Z has decreased to half its value at time 1. Moreover, the sign of the difference between the potential at Z and V is now positive and the clock pulse at time 2 opens gate G3 and shuts gate G4 so that for the next clock pulse period, the potential at X is integrated at C2. This process of successively adding positive or negative increments and testing the sign of the remainder continues until the potential at Z equals V to the required accuracy. It will be appreciated that the potential accumulated at Z can be represented by the series $$\pm\frac{V_o}{2}\pm\frac{V_o}{4}\pm\frac{V_o}{8}\pm \text{ etc.}$$

The integrating circuit consisting of the amplifier C and the capacitor C2 and the resistors R41 and R42 therefore comprises means for summing a series of potentials the moduli of which are proportional to the value of the potential at X at successive clock pulse times. Moreover, it is arranged that the potential at X decreases between successive clock pulse times by one half its value at the preceding clock pulse time. The amplifier D and its circuit connections constitute means for subtracting the sum of the series from the analogue potential to be encoded whilst the gates G5 and G6, the two-state device F and the gates G3 and G4 constitute means for reversing the sign of the succeeding potential or potentials which represent terms in the series, each time the remainder changes sign. Each time a clock pulse is passed by the gate G5, a digit pulse is transmitted to the output terminal T9, such a pulse representing unit value for the corresponding binary digit in the coded form of the analogue potential. As shown in Figure 2(*c*) such pulses are transmitted at times 2 and 5 and no pulses are transmitted at times 1, 3 and 4. The pulse transmitted to terminal T9 at time 0 is representative of the sign of the analogue potential V.

When the equipment has been conditioned for reception by means of the switch S5 the device F is controlled directly by the incoming digits in the gates G5 and G6. Thus a pulse which denotes that a given digit has value "1" allows a clock pulse to pass G6 and operate device F to open gate G4. Conversely, if no input pulse coincides with a clock pulse, the latter pulse is transmitted by G5, and operates device F to open gate G3. Resistor R52 is now connected by the switch S5 in a feedback circuit for the amplifier D so that this amplifier functions as a see-saw phase reversing amplifier to give an output of the correct polarity.

In the example of the invention illustrated, the amplifiers A, B, C, D, preferably have a gain equal to or greater than the reciprocal of the performance accuracy required of the equipment for example if 0.1 percent accuracy is aimed at, the gains of the amplifiers are preferably at least 1,000. Moreover, it will be appreciated that the arrangement of Figure 3 encodes the analogue potential into a digital code with the most significant digit leading. Moreover, as indicated in Figure 2(*e*), the first digit represents the sign of the analogue quantity and the remaining ones the modulus.

What I claim is:

1. Apparatus for encoding an electrical analogue signal into a binary digital code comprising means for setting up a unidirectional signal whose value decreases exponentially, means for setting up the inverse of said unidirectional signal, a signal accumulator, a first normally closed gate for applying said unidirectional signal to said accumulator, a second normally closed gate for applying said inverse signal to said accumulator, means for comparing an applied analogue signal with a signal in said accumulator at successive instants between which said unidirectional signal decreases by one half its value at the preceding instant, and means for opening one of said gates when one compared signal exceeds the other compared signal, and for opening the other gate when said one compared signal is less than said other compared signal.

2. Apparatus for decoding binary digital code signals into an electrical analogue signal comprising means for setting up a unidirectional signal whose value decreases exponentially, means for setting up the inverse of said unidirectional signal, a signal accumulator, a first normally closed gate for applying said unidirectional signal to said accumulator, a second normally closed gate for applying said inverse signal to said accumulator, means for opening one of said gates in response to a unity signification in a received binary code signal, means for opening the other of said gates in response to a zero signification in a received binary code signal whereby the signal accumulated in said accumulator in response to a received binary code signal is the analogue of said received signal.

3. Apparatus according to claim 1, said means for setting up said unidirectional signal comprising a capacitor discharging circuit.

4. Apparatus according to claim 2 said means for setting up said unidirectional signal comprising a capacitor discharging circuit.

References Cited in the file of this patent

UNITED STATES PATENTS 2,521,733 Lesti ---------------- Sept. 12, 1950